United States Patent [19]

Ito

[11] 4,398,263

[45] Aug. 9, 1983

[54] CALCULATOR HAVING INTEGRATING FUNCTION

[75] Inventor: Hisashi Ito, Tanashi, Japan

[73] Assignee: Casio Computer Co., Ltd., Tokyo, Japan

[21] Appl. No.: 252,944

[22] Filed: Apr. 10, 1981

[30] Foreign Application Priority Data

Apr. 15, 1980 [JP] Japan ................................. 55-50085
Apr. 15, 1980 [JP] Japan ................................. 55-50086
Apr. 15, 1980 [JP] Japan ................................. 55-50090

[51] Int. Cl.³ ............................................. G06F 15/31
[52] U.S. Cl. .................................... 364/733; 364/715
[58] Field of Search ............... 364/605, 733, 715, 200, 364/900

[56] References Cited

U.S. PATENT DOCUMENTS 2,994,477 8/1961 Palevsky ............................. 364/733
3,493,734 2/1970 Ricketts, Jr. et al. ............... 364/733
4,288,734 9/1981 Finger ................................. 364/733

*Primary Examiner*—Gary Chin
*Attorney, Agent, or Firm*—Goodman & Woodward Frishauf, Holtz

[57] ABSTRACT

A calculator having an integration function has at least a key input section which in turn has registering keys for inputting data for setting a function to be integrated and an interval of integration, and executing keys for performing the definite integrating function. The function to be integrated is stored in a predetermined register of a RAM by key operation on the key input section. A dividing number for dividing the interval of integration input by the key operation is stored in another register. The interval of integration is divided by the dividing number stored in the latter register. The integrating function is performed sequentially based on the function to be integrated every interval of integration divided by a dividing means and the data input by the key operation for setting the interval of integration.

4 Claims, 14 Drawing Figures

F I G. 2
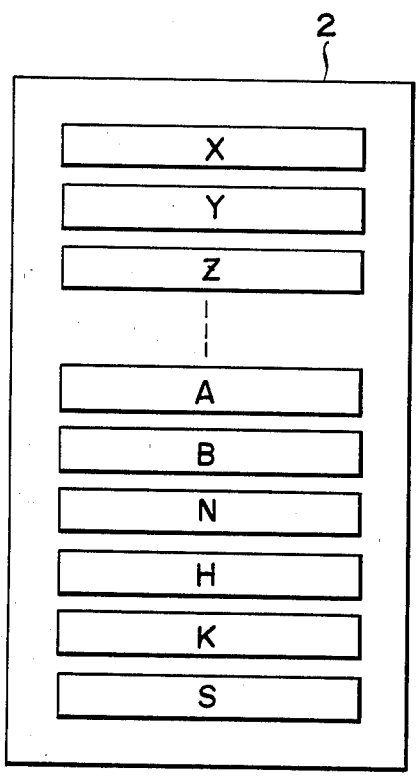
F I G. 3
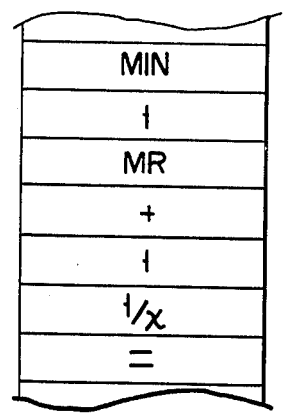

| STATE.NO<br>REG \ STEP | (1)<br>S1~S4 | (2)<br>S5~S6 | (3)<br>S7~S8 |
|---|---|---|---|
| X | 0 | 0 | 0 |
| N | 1 | 1 | 1 |
| H | 1 | 1 | 1 |
| K | 0 | 0 | 0 |
| T | 0.5 | 0.666666666 | 0.666666666 |
| S | 0.444444444 | 1.111111111 | 0.388888888 |

| (4)<br>S9~S12 | (5)<br>S13 | (6)<br>S14~S16 | (7)<br>S17, S13 |
|---|---|---|---|
| 0 | 1.5 | 0.4 | 1 |
| 2 | 2 | 2 | 2 |
| 0.5 | 0.5 | 0.5 | 0.5 |
| 2 | 2 | 1 | 1 |
| 0 | 0 | 0.4 | 0.4 |
| 0.388888888 | 0.388888888 | 0.388888888 | 0.388888888 |

| (8)<br>S14~S16 | (9)<br>S17, S5, S6 | (10)<br>S7~S8 | (11)<br>S9~S12 |
|---|---|---|---|
| 0.666666666 | 0.666666666 | 0.666666666 | 0.666666666 |
| 2 | 2 | 2 | 3 |
| 0.5 | 0.5 | 0.5 | 0.25 |
| 0 | 0 | 0 | 4 |
| 1.066666666 | 0.711111111 | 0.711111111 | 0 |
| 0.388888888 | 1.1 | 0.372222222 | 0.372222222 |

F I G. 8B

| (12) S13~S16 | (13) S17, S13~S16 | (14) S17, S5~S6 | (15) S7~S8 |
|---|---|---|---|
| 0.363636363 | 0.8 | 0.8 | 0.8 |
| 3 | 3 | 3 | 3 |
| 0.25 | 0.25 | 0.25 | 0.25 |
| 3 | 0 | 0 | 0 |
| 0.363636363 | 2.179509378 | 0.726503126 | 0.726503126 |
| 0.372222222 | 0.372222222 | 1.098725348 | 0.367736892 |

| (16) S9~S12 | (17) S13~S16 | (18) S17, S13~S16 | (19) S17, S5~S7, S18 |
|---|---|---|---|
| 0.8 | 0.347826086 | 0.888888888 | 1.098620041 |
| 4 | 4 | 4 | 4 |
| 0.125 | 0.125 | 0.125 | 0.125 |
| 8 | 7 | 0 | 0 |
| 0 | 0.347826086 | 4.385529899 | 0.730883149 |
| 0.367736892 | 0.367736892 | 0.367736892 | 1.098620041 |

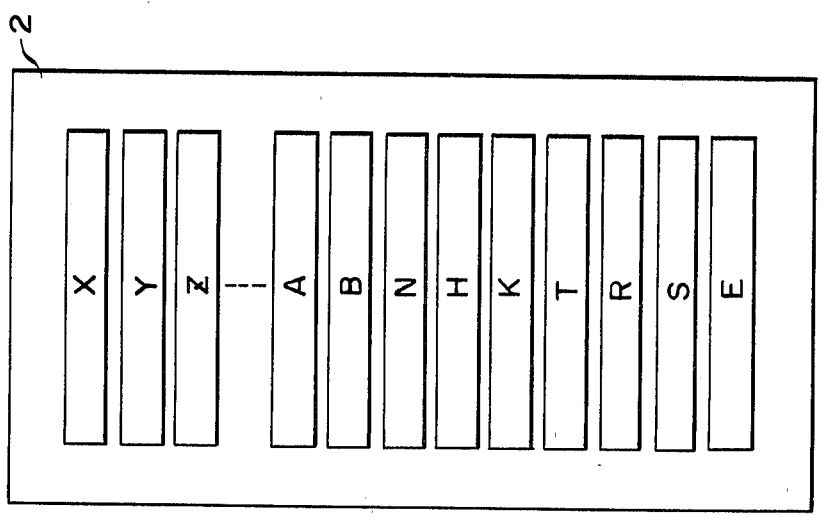
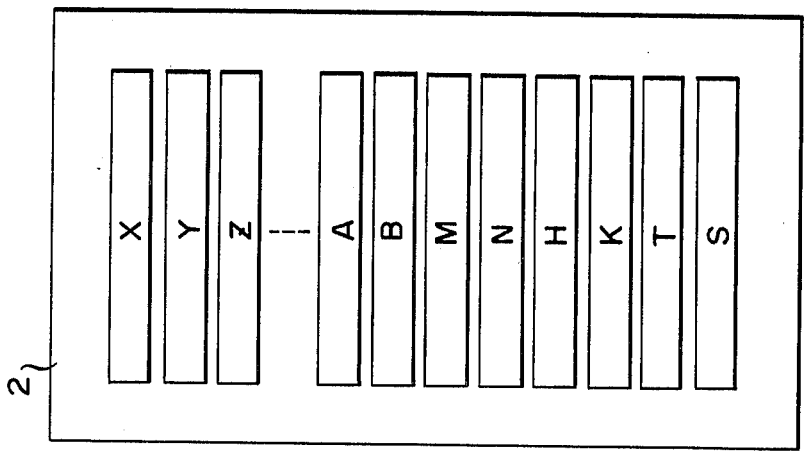

FIG. 11A

| STATE. NO REG\STEP | (1) $S_1 \sim S_4$ | (2) $S_5 \sim S_6$ |
|---|---|---|
| X | 0 | 0 |
| N | 1 | 1 |
| H | 1 | 1 |
| K | 0 | 0 |
| T | 0.5 | 0.666666666 |
| R | 0 | 0 |
| S | 0.444444444 | 1.11111111 |
| E | 0 | 0 |

| (3) $S_7 \sim S_{11}$ | (4) $S_{12} \sim S_{15}$ | (5) $S_{16}$ |
|---|---|---|
| 0 | 0 | 1.5 |
| 1 | 2 | 2 |
| 1 | 0.5 | 0.5 |
| 0 | 2 | 2 |
| 0.666666666 | 0 | 0 |
| 1.11111111 | 1.11111111 | 1.11111111 |
| 0.388888888 | 0.388888888 | 0.388888888 |
| 1 | 1 | 1 |

| (6) $S_{17} \sim S_{19}$ | (7) $S_{20}, S_{16}$ | (8) $S_{17} \sim S_{19}$ |
|---|---|---|
| 0.4 | 1 | 0.666666666 |
| 2 | 2 | 2 |
| 0.5 | 0.5 | 0.5 |
| 1 | 1 | 0 |
| 0.4 | 0.4 | 1.066666666 |
| 1.11111111 | 1.11111111 | 1.11111111 |
| 0.388888888 | 0.388888888 | 0.388888888 |
| 1 | 1 | 1 |

FIG. 11B

| (9) | (10) | (11) |
|---|---|---|
| $S_{20} \sim S_6$ | $S_7 \sim S_{11}$ | $S_{12} \sim S_{15}$ |
| 0.666666666 | 0.666666666 | 0.666666666 |
| 2 | 2 | 3 |
| 0.5 | 0.5 | 0.25 |
| 0 | 0 | 4 |
| 0.711111111 | 0.711111111 | 0 |
| 1.11111111 | 1.1 | 1.1 |
| 1.1 | 0.372222222 | 0.372222222 |
| 1 | 0.01010101 | 0.01010101 |

| (12) | (13) | (14) |
|---|---|---|
| $S_{16} \sim S_{19}$ | $S_{20}, S_{16} \sim S_{19}$ | $S_{20}, S_5 \sim S_6$ |
| 0.363636363 | 0.8 | 0.8 |
| 3 | 3 | 3 |
| 0.25 | 0.25 | 0.25 |
| 3 | 0 | 0 |
| 0.363636363 | 2.179509378 | 0.726503126 |
| 1.1 | 1.1 | 1.1 |
| 0.372222222 | 0.372222222 | 1.098725348 |
| 0.01010101 | 0.01010101 | 0.01010101 |

| (15) | (16) | (17) |
|---|---|---|
| $S_5 \sim S_{11}$ | $S_{12} \sim S_{15}$ | $S_{16}, S_{17}$ |
| 0.8 | 0.8 | 0.347826086 |
| 3 | 4 | 4 |
| 0.25 | 0.125 | 0.125 |
| 0 | 8 | 7 |
| 0.726503126 | 0 | 0.347826086 |
| 1.098725348 | 1.098725348 | 1.098725348 |
| 0.367736892 | 0.367736892 | 0.367736892 |
| $1.1601188 \times 10^{-3}$ | $1.1601188 \times 10^{-3}$ | $1.1601188 \times 10^{-3}$ |

FIG. 11C

| | (18) S20, S16~S19 | (19) S20, S5~S8 | (20) S21, S22 |
|---|---|---|---|
| | 0.888888888 | 0.888888888 | 1.098 |
| | 4 | 4 | 4 |
| | 0.125 | 0.125 | 0.125 |
| | 0 | 0 | 0 |
| | 4.38529899 | 0.730883149 | 0.730883149 |
| | 1.098725348 | 1.098725348 | 1.098725348 |
| | 0.36773689 | 1.098620041 | 1.098 |
| | 1.1601188×10⁻³ | 9.5853885×10⁻⁵ | 9.5853885×10⁻⁵ |

CALCULATOR HAVING INTEGRATING FUNCTION

BACKGROUND OF THE INVENTION

The present invention relates to a calculator having an integrating function which is capable of easily performing definite integration of an arbitrary function.

For calculating the integral $$\int_a^b \frac{1}{x+1} dx,$$

an operation equation $$[\ln(x+1)]_a^b = \ln(b+1) - \ln(a+1)$$

is conventionally prepared by hand before inputting the data into a computer for operation, and each term of this operation equation is input to the computer for performing the definite integration. However, with such a procedure, only one who is well acquainted with integral calculus can perform the operation. Furthermore, it has been disadvantageous in that a more complex equation makes the operation cumbersome. In order to solve this problem, it has been proposed to store in advance the indefinite integral of a function to be integrated in a ROM. For example, for calculating the definite integral $$\int_a^b (k1 x^n + k2 x^{n-1} + \ldots) dx$$

of a polynomial of degree n, it is transformed into a formula $$\left[ \frac{k1}{n+1} x^{n+1} + \frac{k2}{n} x^n + \ldots \right]_a^b,$$

and this formula is stored in the ROM in advance. When performing the operation, the data defining the interval of integration and other data on a and b, coefficients k1, k2, . . . , the exponent n and so on are input to a computer for performing the integration. However, with this method, a formula must be prepared for each different function to be integrated to be stored in the ROM in advance. Since the storing capacity of the ROM is limited, this results in a drawback in that only a limited number of different kinds of functions to be integrated may be stored.

It is an object of the present invention to provide a calculator which eliminates the above problems and which has an integrating function to enable easy integration of an arbitrary function to be integrated.

SUMMARY OF THE INVENTION

In order to achieve the above and other objects, the present invention provides a calculator comprising: key input means having setting keys for setting at least a function to be integrated and the interval of integration, and an executing key for executing definite integration of the inputted function over a definite interval which is inputted by the setting keys; first memory means for storing the function to be integrated which is input by the key operation of the key input means; second memory means for storing a dividing number for dividing said interval of integration; dividing means for dividing the interval of integration determined by the key operation of said key input means by the dividing number stored in the second memory means; readout means for sequentially reading out the function to be integrated from the first memory means; and operating means for sequentially performing the integrating function based on the function to be integrated read out by the readout means, every interval of integration divided by the dividing means, and the data for setting the interval of integration input by the key operation of the key input means.

In accordance with the present invention, it is not necessary to store in advance the function to be integrated in the ROM, and the integration may be performed with a computer by inputting by key operation any function to be integrated together with the interval of integration and the dividing number for dividing the interval of integration during operation. Furthermore, since the dividing number for dividing the interval of integration may be freely set by the key operation according to the integration precision, a calculator having an integrating function may be provided which is capable of performing integrations of high precision without needlessly prolonging the operation time. Furthermore, according to the present invention, in addition to the constituent elements according to the construction described above, the systems may further comprise third memory means for storing an integrated value obtained by the current operation of said operating means and an integrated value obtained by the preceding operation, operation precision calculating means for calculating the operation precision corresponding to said current integrated value and said preceding integrated value stored in the third memory means, and means for detecting whether or not the operation precision calculated by the operation precision calculating means has reached a predetermined value. With this arrangement, the operating means performs the integration while sequentially increasing the dividing number until the integrated value has reached the predetermined operation precision. Thus, it is possible to provide a microcomputer having an integrating function which is capable of automatically setting the dividing number for dividing the interval of the integration and which is capable of integration with high efficiency.

This invention can be more fully understood from the following detailed description when taken in conjunction with the accompanying drawings:

BRIEF DESCRIPTION OF THE DRAWINGS

FIG. 2 is a view illustrating the arrangement of registers included in RAM 2 shown in FIG. 1;

FIG. 3 is a view illustrating the storing condition of a function to be integrated which is stored in RAM 9 shown in FIG. 1;

FIGS. 5(1) to 5(16) are views for showing the storing condition of an X register, a K register, and an S register based on the flow chart shown in FIG. 4;

FIG. 6 shows another embodiment of the present invention, in which the arrangement of the registers is different from that shown in FIG. 2;

FIGS. 8(A) and 8(B) are views illustrating the storing condition of the respective registers according to the flow chart shown in FIG. 7;

FIG. 9 shows another embodiment of the present invention, in which the arrangement of the registers is different from those shown in FIGS. 2 and 6;

FIGS. 11(A) to 11(C) are views illustrating the storing conditions of the respective registers according to the flow chart shown in FIG. 10.

DETAILED DESCRIPTION

Figure 1:
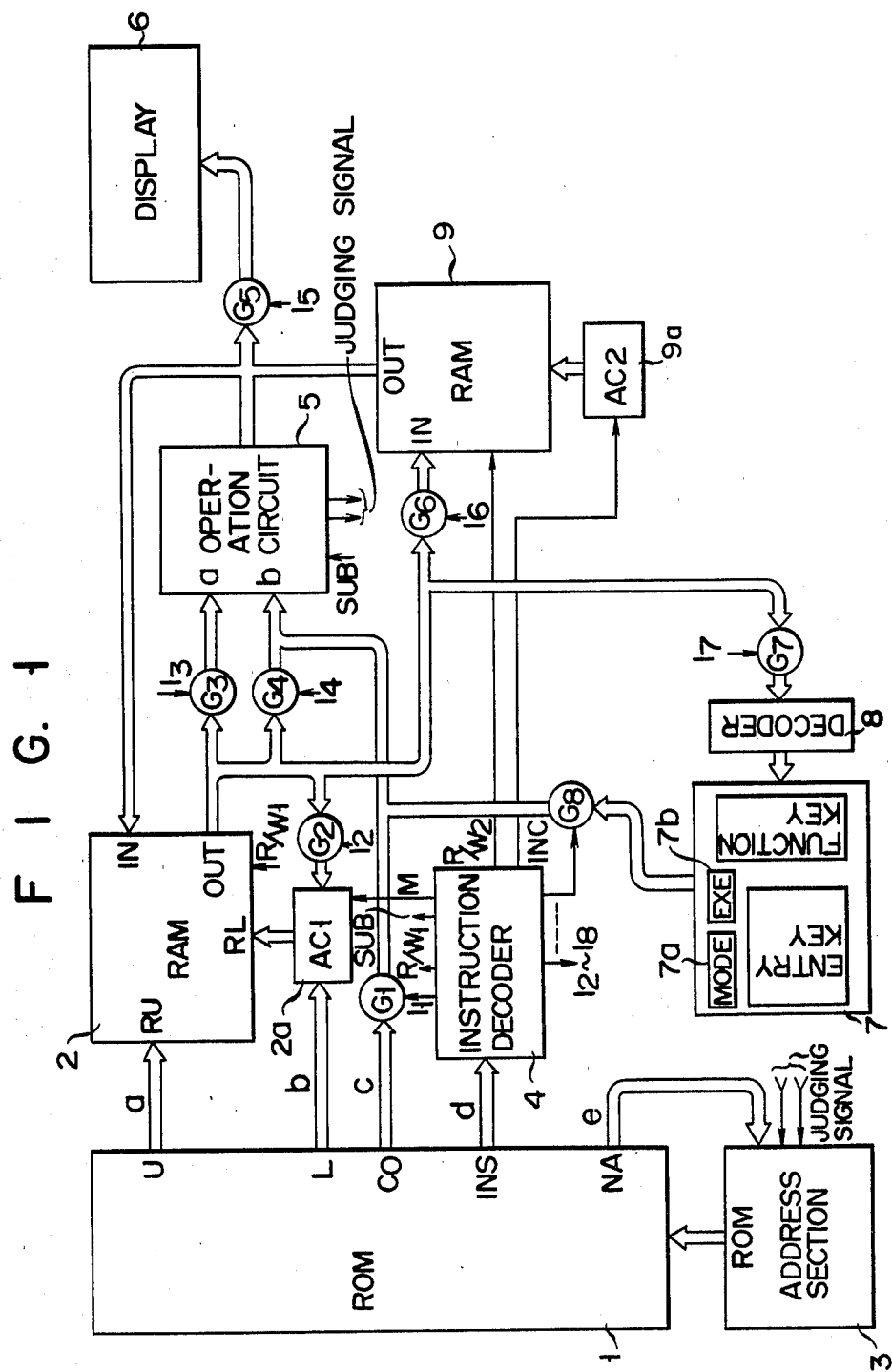
FIG. 1 is a block circuit diagram illustrating a calculator having an integrating function according to an embodiment of the present invention.

The present invention will now be described by way of its examples with reference to the accompanying drawings. FIG. 1 is a block circuit diagram illustrating the construction of the present invention wherein reference numeral 1 denotes a ROM (read-only memory) which stores various kinds of microinstructions. From this ROM 1 are output, parallel to each other through bus lines a to e, a line address signal U for designating the register of a RAM (random access memory) 2, a row address signal L for designating the digit of the above-mentioned register, a numerical code signal C0 used for various operations and judgements on magnitude comparison, operating instructions, an instruction signal INS such as a gate control signal, and a next address signal NA for designating the address next to itself. The next address signal NA output through the bus line e is supplied to a ROM address part 3. This ROM address part 3 designates the address of the ROM 1 according to the next address signal NA described above. The instruction signal INS is supplied through the bus line d to an instruction decoder 4. This instruction decoder 4 decodes the instruction signal INS and outputs various control signals such as gate control signals I1 to I8, read/write signals R/W1 and R/W2, a subtraction instruction SUb, a designating digit length mode M, and an increment signal INC. The designating digit length mode M is supplied to a first address counter 2a and is output for designating a plurality of digits of the register of the RAM 2.

The line address signal U output from the ROM 1 is input to a line addres input terminal RU of the RAM 2 through the bus line a. The row address signal L is supplied to a row address input terminal RL of the RAM 2 through the bus line b and the first address counter 2a.

The RAM 2 comprises X, Y and Z operation registers and A, B, N, H, K and S integration registers as shown in FIG. 2.

According to the present invention, an input function to be integrated, f(x), is integrated according to Simpson's formula. According to Simpson's formula, the solution of the function to be integrated f(x) is obtained by calculating the predetermined interval of integration as an approximate area under a series of parabola sections. For example, when the interval of integration [a, b] is divided by 2n, the function to be integrated $$\int_a^b f(x)dx$$

may be expressed as follows:

$$\int_a^b f(x)dx = \frac{h}{3} \{f_0 + 4(f_1 + f_3 + \ldots f_{2n-1}) + \quad (1)$$

$$2(f_2 + f_4 + \ldots f_{2n-2}) + f_{2n}\}$$

[where $h=(b-a)/2n$, $f_k=f(a+k\times(b-a)/2n)$, ($k=0,1,2 \ldots 2n-1,2n$)]. The predetermined data in expression (1) representing the function to be integrated is stored in the corresponding register included in the RAM 2. Thus, the data a on the lower limit of the interval of integration [a, b] is stored in the A register, and the data on the upper limit b is stored in the B register. The dividing number 2n of the interval of integration is stored in the N register. The divided width $(b-a)/2n$ obtained by dividing the difference between the limits of integration a and b by 2n is stored in the H register. The cardinal number identifying the term of expression (1) which is presently being integrated is stored in the K register. The final integrated value is stored in the S register. Writing in and reading out from each register is controlled by the R/W1 signal.

The data outputs from an output terminal OUT of the RAM 2 are supplied as an operand and an operator to input terminals a and b of an operation circuit 5 through gate circuits G3 and G4 to which are input the control signals I3 and I4, respectively. The operation result outputted by the operation circuit 5 is inputted to an input terminal IN of the RAM 2. The RAM 2 is also indirectly address-designated by the address data stored therein. The output data of the operation circuit 5 is also supplied to a display 6 through a gate circuit G5 to which the gate control signal I5 is supplied for display. For performing a judgement on the magnitude of the data, judgement signals indicating the presence or absence of the data and the presence or absence of the carry signal are outputted from the operation circuit 5 to the ROM address part 3.

Numeral 7 denotes a key input section which has a MODE key 7a for designating the mode for writing the function to be integrated, the mode for executing the integration, and the mode for performing normal operations; an EXE key 7b for instructing integration to be performed; registering keys for inputting data; and function keys (such as Min, MR, [¼], etc. not shown) for instructing various operations to be performed, such as the four arithmetic operations, and SIN and COS. The designation of the mode is performed by key operation of the MODE key 7a and the registering keys. To this key input 7 are input key sampling data from a register (not shown for general construction) inside the RAM 2 after the data have sequentially passed through a gate circuit G7 and have been decoded by a decoder 8 for key sampling. When the key operation is not performed at the key input section 7, the above-mentioned register repeats the unitary increments of its content. When the keys are operated, the key data is written in a predetermined register of the RAM 2 through a gate circuit G8 and the operation circuit 5.

When performing the writing mode of the function to be integrated by the mode designating key [MODE] 7A, the data on the function to be integrated, which is input from the key input section 7, is once written in the RAM 2 and is thereafter written in a RAM 9 through an input terminal IN and through a gate circuit G6. When the mode for performing integration is designated, the function to be integrated which is written in the RAM 2 is read out from the RAM 2 for performing the integration. The RAM 9 is sequentially address-designated by a second address counter 9a which is incremented by the INC signal and is also controlled for writing and readout by the read/write signal R/W2.

The mode of operation of the computer of the construction described above will be described with reference to the views and the flow chart shown in FIGS. 3 to 5. Here, the function to be integrated is $f(x) = 1/(x+1)$, the limits of integration are [0, 4] and the dividing number is n=2, for performing the operation $$\int_0^4 \frac{1}{x+1} dx.$$

The mode is set to the writing mode of the function to be integrated by operating the [MODE] key 7a and the registering keys on the key input section 7. The keys are operated to input the function to be integrated, $(1/x+1)$, and it is written as the program data in the RAM 9 as shown in FIG. 3. For example, by operating the [Min] and [1] keys, the storing region of the RAM 9 for storing a variable x is determined. By operating the [MR] key, an instruction for reading out the variable x is written into the RAM 9. By operating the [+] and [1] keys, the operation "+1" to the variable x is performed. By operating the [1/x] key, the operation for obtaining the inverse number $(1/x+1)$ of "x+1" is instructed, and this operation is executed upon operation of the [=] key, The input of the function to be integrated $f(x) = 1/x+1$ is completed by the above key operations. The mode is changed to the integration performing mode by operating the [MODE] key 7a and the registering keys. When the limits of integration "0" and "4" and the dividing number "2" are registered, "0" is written in the A register, "4" is written in the B register, and 2n, that is, operation result "4" of 2×2, is written as the dividing number in the N register.

Figure 4:
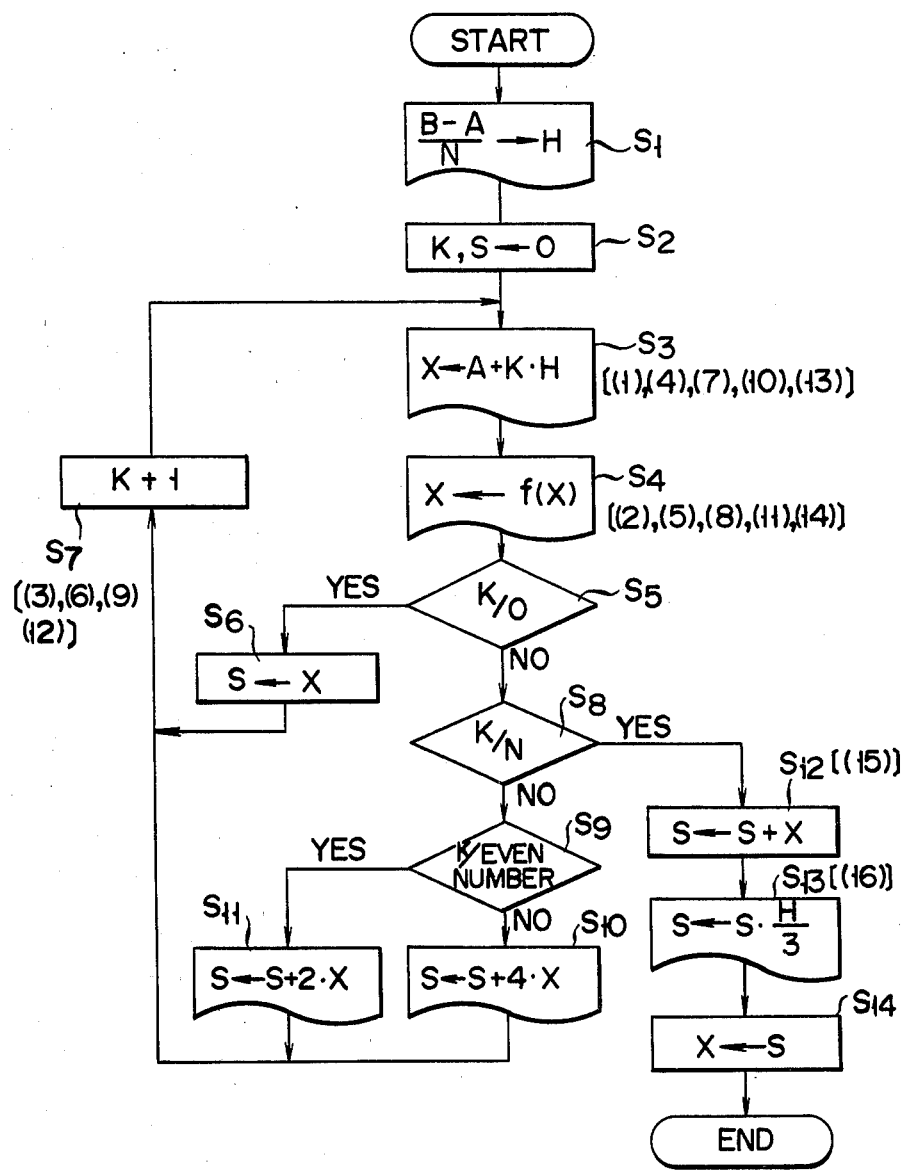
FIG. 4 is a flow chart showing the mode of operation of the block circuit diagram shown in FIG. 1, in the case where the registers included in the RAM 2 are under the condition shown in FIG. 2.

When the [EXE] integration performing key 7b is operated, the integration is performed according to the flow chart shown in FIG. 4. The reference numerals 1–16 shown in this flow chart correspond to those in the view of FIG. 5. Step S1 is for obtaining the divided width h by obtaining the difference between the data stored in the A and B registers and then dividing it by the dividing number stored in the N register. After the contents of the A and B registers are read out and the subtraction "4−0" is performed, the subtraction result is divided by the content "4" of the N register. Thus, the divided result "1" is written in the H register.

In the next step S2, the K and S registers are cleared and the processing advances to step S3.

In step S3, a $+k(b-a/2n)$ of expression (1) is obtained. The contents of the K and H registers are multiplied. The content of the A register is added to this result, and the addition result is written in the X register. Since the contents of both the A and K registers are "0", the content of the X register also becomes "0" as shown in FIG. 5(1), and the program advances to step S4.

In step S4, $f(a+k(b-a/2n))$ of expression (1), that is, the value of fk, is obtained. The function to be integrated $1/(x+1)$, which is input in advance, is replaced by the content of the X register obtained in step S3, and the obtained result is written in the X register. The functions to be integrated which are written in the RAM 9 are address-designated by the second address counter 9a while the program content shown in FIG. 3 is sent to the RAM 2 for each step and the operation is executed by the operation circuit 5 according to the content of the X register. Since the content of the X register is "0", f(0)=1, and "1" is written in the X register as shown in FIG. 5(2).

The program advances to step S5 and a judgment is made as to whether or not the content of the K register is "0". That is, the content of the K register is read out in the operation circuit 5. A judgement is made when the judgement signal is output from the operation circuit 5 to the ROM address part 3 according to the presence or absence of the data and carry signal. Since the content of the K register is "0" as shown in FIG. 5(2), the program advances to step S6. In step S6, the content of the X register is transferred to the S register and "1" is written in the S register.

In step S7, the addition "+1" is performed for the K register for counting the number of the terms to be processed in expression (b). The numerical code signal C0 output from the ROM 1 is supplied to the operation circuit 5 through the bus line c to perform the addition "+1" to the content of the K register. Thus, the content of the K register becomes "1" as shown in FIG. 5(3), and the program returns to step S3.

Figure 5:
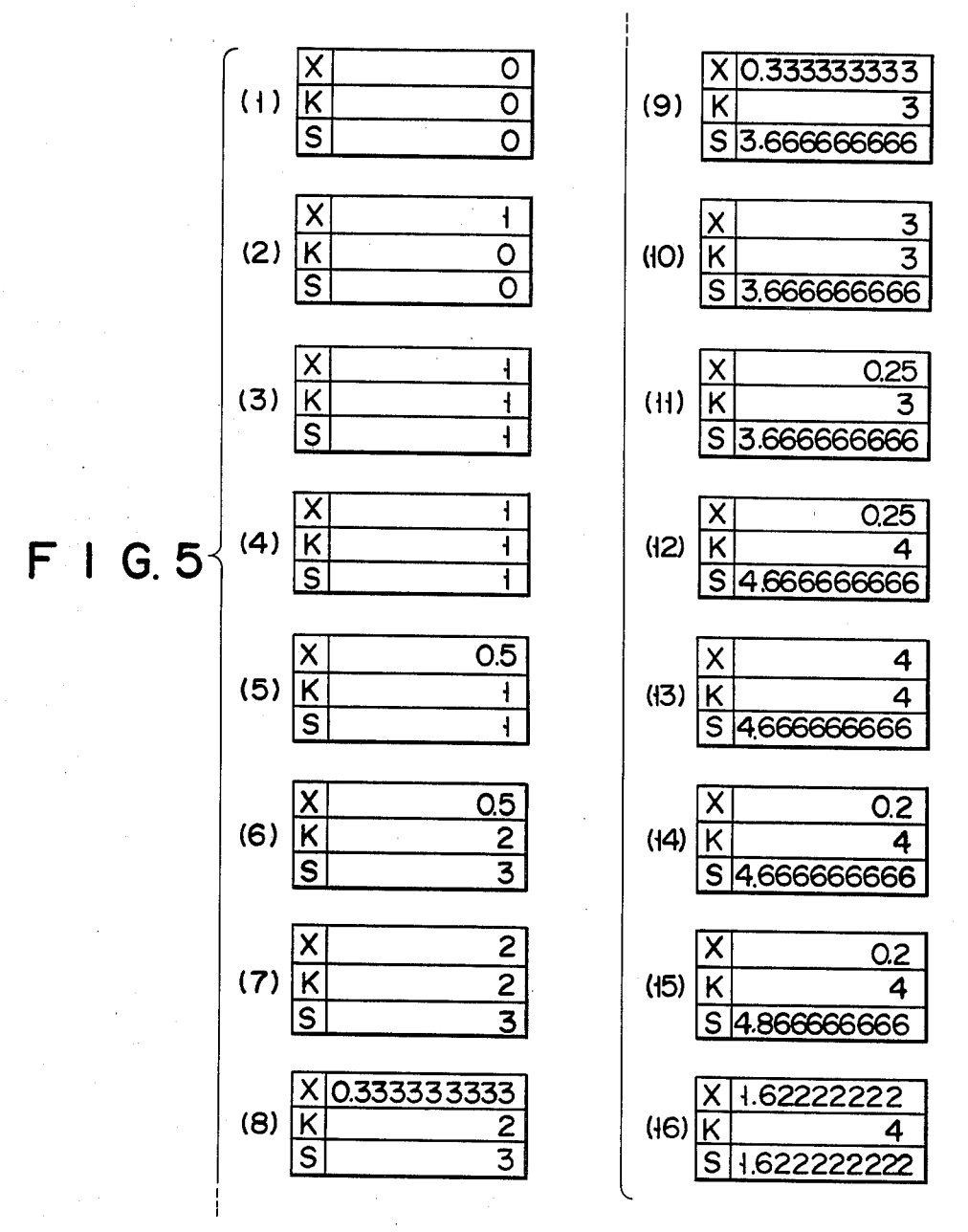

Since the contents of both the K and H registers are "1", the content of the X register becomes "1" in step S3, as shown in FIG. 5(4). In the next step S4, fk, that is, f(1), is obtained in a manner similar to that described above. As a result, "0.5" is written in the X register, as shown in FIG. 5(5).

In step S5, since the content of the K register is "1", a judgment is made that the data is not "0" and the program advances to step S8. In step S8, a judgement is made as to whether or not the contents of the K and N registers are equal to each other so as to judge which term of expression (1) has been calculated. This judgement is made by reading out the contents of these registers into the operation circuit 5 and obtaining the difference therebetween. Since the content of the K register is "1" and the content of the N register is "4", they are not equal to each other, so the program advances to step S9.

In step S9, a judgement is made as to whether or not the cardinal number defining the term currently calculated in expression (1) is an odd or even number by making a judgement as to whether or not the content of the K register is an odd or even number. Since the content of the K register is "1" as shown in FIG. 5(5), the program advances to step S10. In step S10, the operation for a term of odd cardinal number is performed. Thus, fk is multiplied by 4 and the result is added to the value obtained by the integration up to the preceding term. Thus, "0.5" which is the content of the X register is multiplied by "4", and its result "2" is added to the content "1" of the S register. The content of the S register becomes "3" as shown in FIG. 5(6). The program thus advances to step S7. The content of the K register becomes "2", and the program then advances to step S3.

In step S3, since the content of the K register is "2" and the content of the H register is "1" as shown in FIG. 5(7), the content of the X register becomes "2". In step S4, the operation f(x), that is, f(2), is performed, and "0.3...3" is written in the X register as shown in FIG. 5(8). Thus, the program advances to step S5, S8 and S9. In step S9, since the content in step S9 is "2", the program advances to step S11. In step S11, the operation for a term of even cardinal number in expression (1) is performed, the result is doubled for fk, and this is added to the integrated value up to the preceding integration. Then, the content "0.3...3" of the X register is multiplied by "2". The obtained result "0.6...6" and the content "3" of the S register are added together, and "3.7...6" is written in the S register as shown in FIG. 5(9). The program advances to step S7, and the content of the K register is incremented by 1.

Steps S3, S4, S5, S8, S9, S10 and S7 are performed in a similar manner as shown in FIG. 5(12). Steps S3, S4 and S5 are further executed to advance to step S8. In step S8, since the content of the K register as shown in FIG. 5(14) is "4" which is equal to the content "4" of the N register, the program advances to step S12. In step S12, the operation for the term f2n of expression (1) is performed. The content of the X register (f2n) obtained in the preceding step S4 is added to the content of the S register which is the integrated value up to the preceding integration. The operation result "4.86...6" is written in the S register as shown in FIG. 5(15). The program advances to step S13 wherein the operation result in the S register is multiplied by the value obtained by dividing the divided width by 3 to calculate the true integrated value. Since the content of the H register is "1", the content of the S register is multiplied by "$\frac{1}{3}$", and "1.62...2" is written in the S register as shown in FIG. 5(16). The program further advances to step S14 wherein the content of the S register is transferred to the X register and is displayed at the display 6 as the integrated value.

The value $$\int_0^4 \frac{1}{x+1} dx = [\ln(x+1)]_0^4$$

is thus obtained as "1.62...2". However, for the sake of simplicity, it was assumed that n=2 and the dividing number is 4. Although a small error results as compared with the true value, the error may be reduced by making the value of n larger.

The above description has been made for a case where the interval of integration ]a, b] is divided by the dividing number 2n. However, it is also possible to adopt the dividing number $2^n$ to work with the function to be integrated f(x) for performing the integration. An embodiment will be described, wherein $2^n$ is used as the dividing number, referring to FIGS. 6, 7, 8(A) and 8(B). When the interval of integration [a, b] of the function to be integrated is divided by $2^n$ is Simpson's formula described above, the function to be integrated f(x) may be represented by the recurrence expressions below:

$$S_1 = \frac{h1}{3} \{f(a) + f(b)\} + \frac{4}{3} h1 f(a + h1) \quad (2)$$

$$T1 = \frac{4}{3} h1 f(a + h1) \quad (3)$$

$$Tn = \frac{4}{3} hn \sum_{k=0}^{2k+1} f\{a + (2k+1)hn\} \quad (4)$$

(where $(2k+1) < 2^n$)

$$Sn = \frac{1}{2}\left(Sn - 1 - \frac{1}{2} Tn - 1\right) + Tn \quad (5)$$

$$\left(\text{where } hn = \frac{b-a}{2^n}\right)$$

Accordingly, Sn is the ultimate objective integrated value. The integration operation according to this embodiment is also performed with the circuit construction shown in FIG. 1. However, as shown in FIG. 6, an M register and a T register are added to the RAM 2 in addition to the registers of the embodiment shown in FIG. 2. The predetermined data of the expressions described above are stored in the corresponding registers in the RAM 2. The lower limit data a of the interval of integration [a, b] is stored in the A register and the upper limit data b is stored in the B register. An exponent m of $2^m$ is stored in the M register by the key operation as data to be processed later as a dividing number. A dividing parameter n(1, 2, ... m) of $2^n$ for setting the dividing numbers $2^1, 2^2, \ldots 2^n$ is stored in the N register. n takes any value as a count value up to and including a value of m which is keyed in. The divided width $(b-a)/2^n$ obtained by dividing the interval of integration by $2^n$ is stored in the H register. $K(=2^n)$ in the accumulating parameter $2k+1$ in expression (4) above is stored in the K register. The value of Tn represented by expression (4) above is stored in the T register and the value of Sn represented by equation (5) above is noted in the S register. The writing in and reading out from the registers described above is performed when they are supplied with R/W1 signals.

The integration operation in an embodiment in which the registers as shown in FIG. 6 are included in the RAM 2 will be described with reference to FIGS. 7, 8(A) and 8(B).

It is assumed that the function to be integrated is $f(x)=1/(x+1)$, the interval of integration is [0, 2], the dividing number is M=4, and the operation $$\int_0^2 \frac{1}{x+1}$$

is to be performed.

By operating the MODE key 7a and the registering keys of the key input section 7, the mode is set to the writing mode of the function to be integrated. The keys are operated to input the function to be integrated $1/x+1$ as the program data in the RAM 9 as shown in FIG. 3 in a manner similar to the case described above. For example, by operating the Min key and 1 key, the storing region of the RAM 9 for storing the variable x is determined. An instruction for reading out the variable x is written in the RAM 9 upon operation of the MR key, and the operation "+1" is performed on the variable x upon operation of the + and 1 keys. By operating the 1/x key, the operation for obtaining the inverse function 1/(x+1) of "x+1" is instructed. This operation is executed by operating the ⊟ key. The input of the function to be integrated, $f(x)=1/(x+1)$, is completed by the above key operation. The mode is changed to the integration executing mode by operating the MODE key 7a and registering keys. When the limits of integration "0" and "2" and the dividing number "4" are registered, "0" is written in the A register, "2" is written in the B register, and "4" is written in the M register.

Figure 7:
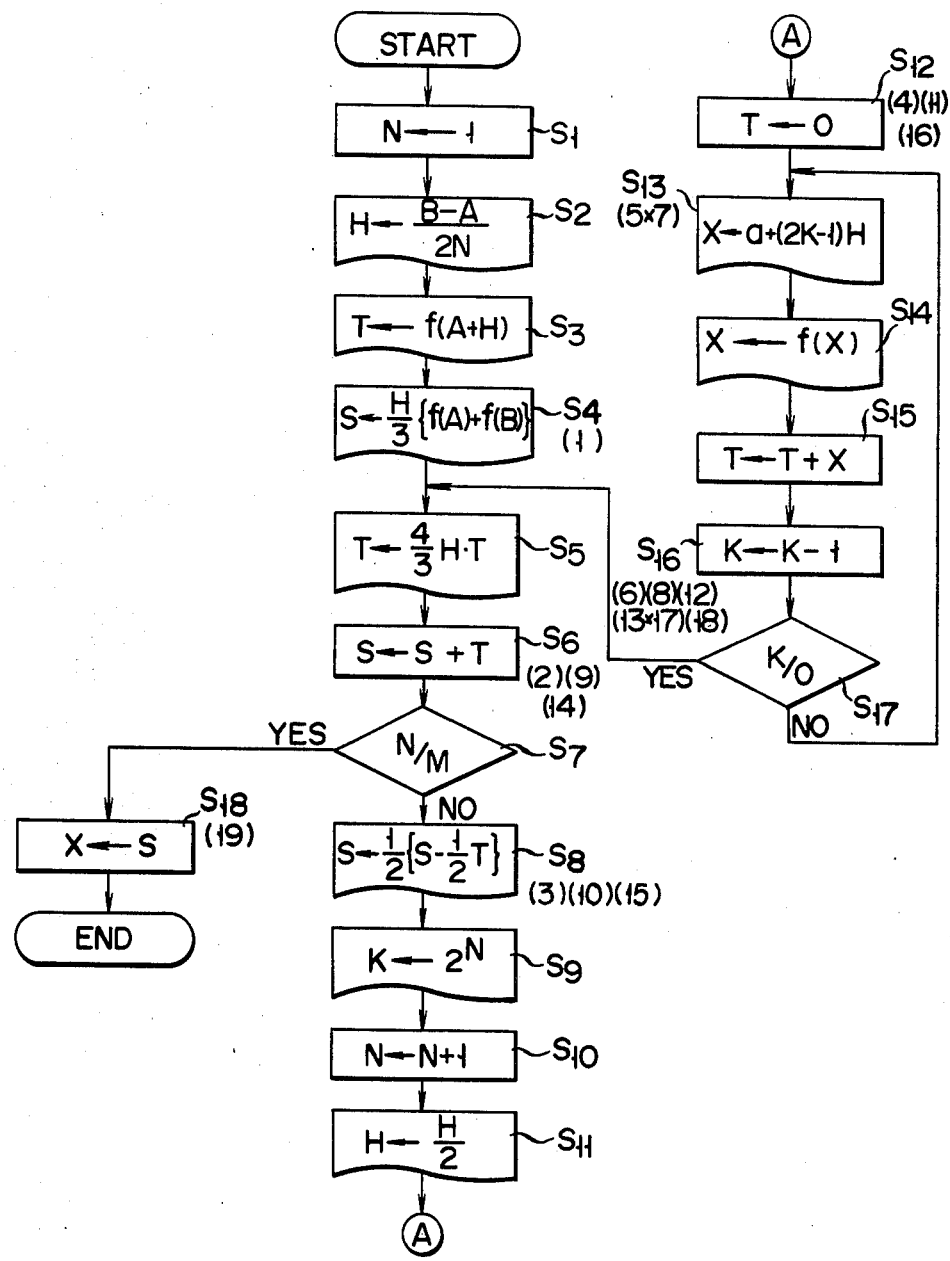
FIG. 7 is a flow chart showing the mode of operation of the block circuit diagram shown in FIG. 1 in the case where the registers included in the RAM 2 are under the condition shown in FIG. 6.

When the EXE integration executing key 7b is operated under this condition, the definite integration is performed according to the flow chart shown in FIG. 7. Reference numerals 1 to 19 shown in this flow chart correspond to those in the views of FIGS. 8(A) and 8(B). In step S1, the numerical code signal C0 "1" as the dividing parameter is written as n=1 in the N register of the RAM 2 from the ROM 1 through the operation circuit 5. In the next step S2, the divided width obtained by dividing the interval of integration (b−a) stored in the A and B registers by $2^n$ is stored in the H register. After the contents of the A and B registers are read out in the operation circuit 5 and the subtraction "2−0" is performed, the subtraction result "2" is temporarily written in the B register again. The operation of $2^n$ for the content of the N register is performed in the respective X, Y and Z registers in the RAM 2. Since the content of the N register is "1", $2^n$ becomes "2". The division of the subtraction result "2" temporarily stored in the B register by the value "2" of $2^n$ is performed by the operation circuit 5, and the operation result "1" is written in the H register and the program advances to step S3.

In step S3, the calculation of the value f(a+h) for $x=a+h$ is performed. After adding the contents of the A and H registers, the function to be integrated 1/(x+1) input to the RAM 9 in advance is replaced by this addition result. The obtained result is written in the T register. Since the contents of the A and H registers are "0" and "1", respectively, the addition result becomes "1". The function to be integrated written in the RAM 9 is address-designated by the second address counter 9a while the contents of the program shown in FIG. 3 is sent step by step to the RAM 2 and the operation circuit 5 in a manner similar to the case described above. The calculation of f(1) is performed based on the addition result "1" described above. Consequently, the value of f(1), or "0.5", is written in the T register as shown in FIG. 8(A).

The program advances to step S4 where the operation of the first term "hl/3{f(a)+f(b)}" of expression (2) is performed. Since the content of the A register is "0", $f(a)=f(0)$ becomes "1". Since the content of the B register is "2", $f(b)=f(2)$ becomes "0.3 ... 3". The addition result of f(a) and f(b) is multiplied by $\frac{1}{3}$ obtained by dividing the content "1" of the H register by 3. The operation result "0.4 ... 4" is written in the S register as shown in (1) of FIG. 8(A).

In step S5, the calculation of the second term {4/3hlf(a+hl)} of expression (2) for obtaining S1 is performed. The contents of the H and T registers are multiplied together. After multiplying the obtained result by a constant 4/3, the operation result is written in the T register. The content "1" of the H register and the content "0.5" of the T register are supplied to the operation circuit 5 for performing the multiplication "1×0.5". The operation result is written in the T register once and is thereafter sent to the operation circuit 5 again. Simultaneously, the numerical code signal C0 (4/3=1.3 ... 3) is also supplied from the ROM 1 to the operation circuit 5 for multiplication. The operation result "0.6 ... 6" is written in the T register as shown in (2) of FIG. 8(A), and the program advances to step S6. In step S6, the first and second terms of expression (2) are added together. The content "0.4 ... 4" of the S register and the content "0.6 ... 6" of the T register are read out in the operation circuit 5 for addition. The addition result is written in the S register again as shown in (2) of FIG. 8(A). Thus, the value of S1 of expression (2) is stored in the S register.

In the next step S7, it is detected whether or not the dividing parameter n stored in the N register and the data m for determining the dividing number stored in the M register are equal. The contents of the N and M registers are supplied to the operation circuit 5 which judges whether or not the difference therebetween is "0", that is, whether or not they are equal and issues a judgement signal representing the absence or presence of the data or the carry signal. Since the content of the N register is "1" and the content of the M register is "4", they are not equal and the program advances to the next step S8.

In step S8, the first term of expression (5) for obtaining Sn is calculated. The value obtained by dividing the content of the T register by "2" is subtracted from the content of the S register and the obtained result is further divided by "2". Consequently, "0.38 ... 8" is written in the S register as shown in (3) of FIG. 8(A). In step S9, the calculation of $2^n$ having the dividing parameter of the N register as the exponent is performed, and the obtained result is written in the K register. Since the content of the N register is "1", "2" is written in the K register as shown in (4) of FIG. 8(A), and the program advances to the next step S10. In step S10, the dividing parameter is incremented by 1 by performing the operation "+1" on the content of the N register, making the content of the N register "2".

In the next step S11, a new divided width is set by dividing the divided width of the H register by "2". The content of the H register becomes "0.5", and the program advances to step S12. In step S12, "0" is written in the T register to clear it.

In steps S13 to S17 to follow, the operation of $$\sum_{k=0}^{2k+1<2^n} f\{a + (2k + 1)hn\}$$

of expression (4) for obtaining Tn is performed. In step S13, the operation "2k−1" is performed for the accumulating parameter stored in the K register. The divided width in the H register is multiplied by this operation result. The content of the A register is then added to the result obtained. Since the content of the K register is "2", the operation "2×2−1" is performed. The operation result "3" is multiplied by the content "0.5" of the H register. The content of the A register is added to the multiplication result "1.5". Since the content of the A register is "0", the content of the X register becomes "1.5" as shown in (5) of FIG. 8(A), and the program advances to the next step S14. In step S14, the operation on the content "1.5" of the X register is performed according to the function to be integrated. As a result, f(1.5) is calculated as "0.4" and is written in the X register as shown in (6) of FIG. 8(A). In step S15, the integrated value of f(x) up to the preceding calculation and the current value of f(x) are added. At this time, since the content of the T register is "0" and the content of the X register is "0.4", "0.4" is written in the T register. The program then advances to step S16 wherein the operation of "−1" is performed on the accumulating parameter of the content of the K register. The program then advances to step S17 wherein a judgement is made as to whether or not the accumulating parameter of the K register is "0". Since the content of the K register is "1" as shown in (7) of FIG. 8(A), the program goes back to the step S13. In step S13, the same process as described above is performed on the content "1" of the K resister, and "1" is written in the X register as shown in (7) of FIG. 8(A). Steps S14 to S16 are performed in a manner similar to that described above. Then, the content of the K register becomes "0" as shown in (8) of FIG. 8(A). A judgement of "YES" is made in the next step S17 and the program goes to step S5. In step S5, the integrated value is multiplied by 4/3 hn in expression (3) for obtaining Tn. As a result, "0.71 ... 1" is written in the T register as shown in (9) of FIG. 8(A). Steps S6 to S8 are performed in a manner similar to that described above, and the respective registers are placed under the condition shown in (10) of FIG. 8(A). In step S9, the calculation "$2^2$" is performed for the content "2" of the N register, and "4" is written in the K register, as shown in (11) of FIG. 8(A). Steps S10 to S12 are executed as has been described, and the contents of the respective registers become as shown in (11) of FIG. 8(A). Furthermore, steps S13 to S17 are sequentially executed in a manner similar to that described above until the content of the K register becomes "0".

When the content of the K register becomes "0" as shown in (13) of FIG. 8(B), the program goes to steps S5 and S6. In step S6, the content "0.72659..." of the T register obtained by the current calculation is added to the content "0.372..." of the s register obtained up to the preceding calculation. As shown in (14) of FIG. 8(B), "1.09872" is written in the S register. In the next step S7, since the content of the N register is "3", it is not yet equal to the content "4" of the M register so that the program advances to step S8 and the respective registers are placed under the condition shown in (15) of FIG. 8(B). In the next step S9, the calculation of "$2^3$" is performed and "8" is written in the K register. In the next step S10, the operation "+1" is performed so that the content of the N register becomes "4". Steps S11 and S12 are executed next as shown in (16) of FIG. 8(B). Steps 13 to S17 are sequentially repeated until the content of the K register is "0".

When the content of the K register becomes "0" in step S16, as shown in FIG. 8(B), a judgement of "YES" is made in the next step S17 and the program goes to steps S5, S6 and S7. In step S7, since the content of the N register is "4" as shown in (18) of FIG. 8(B), it is equal to the content "4" of the M register and the program advances to step S18. In step S18, the content "1.0986..." of the S register is transferred to the X register and is displayed as the objective integrated value at the display 6.

Although the integrated value alone was displayed in the above embodiment, the values of f(a) and f(b), the dividing number and so on may also be displayed.

The above description has been made with reference to embodiments wherein the dividing number for dividing the interval of integration of the function to be integrated may be freely input by key operation. However, in an embodiment to be described hereinafter, an operation precision is obtained by comparing the preceding operation result with the current operation result, and the integration is performed as the dividing number is gradually increased until the operation precision reaches a predetermined value, thereby automatically setting the dividing number.

This embodiment of the present invention will now be described with reference to FIGS. 9, 10, 11(A), 11(B) and 11(C). The recurrence expressions for the function f(x) to be integrated the same as expressions (2) to (5) so that the description thereof will be omitted. The integration operation is performed in this embodiment with the circuit construction shown in FIG. 1. However, the registers shown in FIG. 4 are included in the RAM 2. That is, the registers denoted by symbols A, B, N, H, K, T, R, S and E are included in the RAM 2 in addition to the operation registers represented by symbols X, Y and Z. The predetermined data of the above-mentioned expressions are stored in the corresponding registers. The lower limit a of the interval [a, b] of integration is stored in the A register and the upper limit b is stored in the B register. The exponent n of the dividing number represented as $2^n$ is stored as the dividing parameter in the N register. The divided width $(b-a)/2^n$ obtained by dividing the interval of integration by the dividing number is stored in the H register. The accumulating parameter $2K+1$ in expression (4) is stored in the K register. $S_{n-1}$, that is, the integrated value obtained by the preceding calculation of expression (5), is stored in the R register. Tn in expression (4) is stored in the T register, and Sn in expression (5) is stored in the S register. The value representing the operation precision is stored in the E register and is obtained from the integrated value up to the preceding calculation stored in the R register and the value of the current calculation stored in the S register. Writing in and reading out from these registers are performed by R/W1 signals.

The integration operation in the embodiment which includes these registers in the RAM 2 as shown in FIG. 9 will be described with reference to FIGS. 10, 11(A), 11(B) and 11(C).

It is assumed that the function to be integrated is $f(x)=1/(x+1)$, the interval of integration is [0, 2], and the operation $$\int_0^2 \frac{1}{x+1} dx$$

is performed.

By operating the [MODE] key 7a and the registering keys of the key input section 7, the mode is set to the writing mode of the function to be integrated. The function to be integrated, $1/(x+1)$, is input as program data in the RAM 9 as shown in FIG. 3, as in the above embodiment. The [Min] and [1] keys are operated to determine the storing region of the variable x in the RAM 9. An instruction for reading out the variable x is written in the RAM 9. The operation "+1" is performed on the variable x by operating the [+] and [1] keys. The operation for obtaining the inverse function $1/(X+1)$ of "x+1" is instructed by operating the [1/x] key, and this is executed upon operation of the [=] key. The input of the function to be integrated $f(x)=1/(x+1)$ is completed by the above key operation. The [MODE] key 7a and the registering keys are operated to change the mode to the integration executing mode. When the limits of integration "0" and "2" and registered, "0" is written in the A register and "2" is written in the B register.

Figure 10:
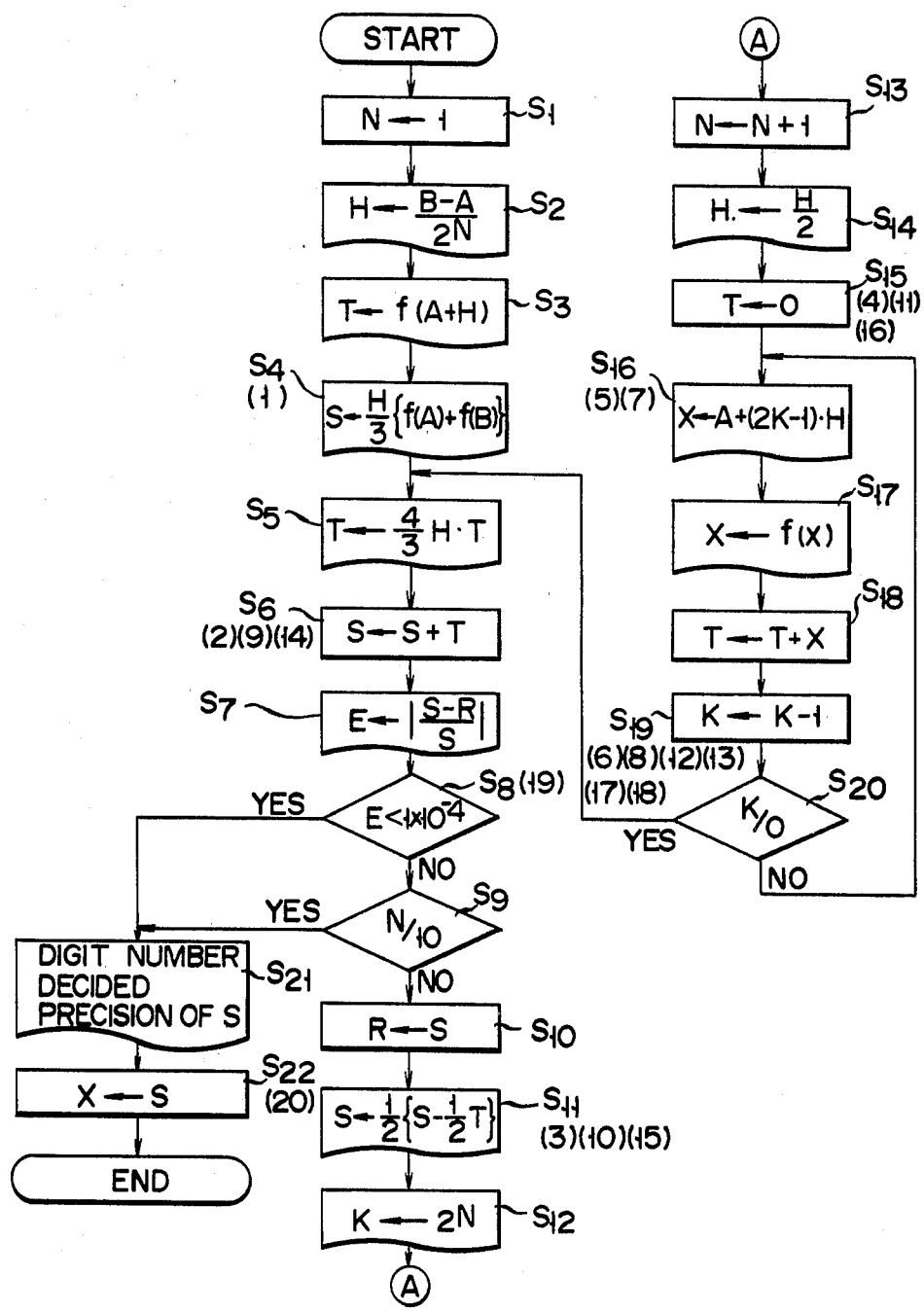
FIG. 10 is a flow chart showing the mode of operation of the block circuit diagram shown in FIG. 1 in the case where the registers included in the RAM 2 are under the condition shown in FIG. 9.

When the [EXE] integration executing key 7b is operated under this condition, the definite integration is performed according to the flow chart shown in FIG. 10. The numerals 1 to 20 shown in this flow chart correspond to those shown in the views of FIGS. 11(A), 11(B) and 11(C). In step S1, the numerical code signal C0 "1" output from the ROM 1 to the N register as the dividing parameter is written in the N register of the RAM 2 through the operation circuit 5. In the next step S2, the divided width is obtained by dividing the interval of integration stored in the A and B registers by $2^n$ and is stored. The contents of the A and B registers are read out to the operation circuit 5. After the subtraction "2−0" is performed, the subtraction result "2" is temporarily written in the B register. The calculation of $2^n$ is performed for the content of the N register. Since the content of the N register is "1", $2^n$ becomes "2". The division of the subtraction result stored in the B register by "2", which is the value of $2^n$, is performed by the operation circuit 5, and the operation result "1" is written in the H register to advance the program to step S3.

In step S3, the calculation of f(a+h), the value of the function for $x=a+h$, is performed. The contents of the A and B registers are added together. The function to be integrated 1/(x+1) which is inputted to the RAM 9 in advance is replaced by this addition result for calculating this value, and this value is written in the T register. Since the contents of the A and H registers are "0" and "1", respectively, the addition result becomes "1". The function to be integrated in the RAM 9 is address-designated by the second address counter 9a while the program content shown in FIG. 3 is sent step by step to the RAM 2 and the operation circuit 5 as in the case of the above embodiments to perform the calculation of f(1) based on this addition result. The value of f(1) is "0.5", which is written in the T register as shown in FIG. 11(A).

The program then advances to step S4 where the calculation of the first term h1/3{f(a)+f(b)} of expression (2) above is performed. Since the content of the A register is "0", $f(a)=f(0)$ becomes "1". Since the content of the B register is "2", $f(b)=f(2)$ becomes "0.3 . . . 3". The addition result of f(a) and f(b) is multiplied by $\frac{1}{3}$ which is obtained by dividing the content "1" of the H register by 3. This operation result, "0.4 . . . 4", is written in the S register, as shown in (1) of FIG. 11(A).

In step S5, the second term (4/3)h1f(a+h1) of expression (2) is performed. The contents of the H and T registers are multiplied together. The product is multiplied by a constant, 4/3. The operation result thus obtained is written in the T register. The content "1" of the H register and the content "0.5" of the T register are supplied to the operation circuit 5 for performing the multiplication "1×0.5". The operation result is first written in the T register and is thereafter sent to the operation circuit 5 again. The numerical code signal C0 (4/3=1.3 . . . 3) is also supplied to the operation circuit 5 from the ROM 1 for multiplication. The operation result "0.6 . . . 6" is written in the T register as shown in (2) of FIG. 11(A) to advance the program to the next step S6. In step S6, the first and second terms of expression (2) are added together. The content "0.4 . . . 4" of the S register and the content "0.6 . . . 6" of the T register are read out to the operation circuit 5 for addition. The sum "1.1 . . . 1" is written in the S register as shown in (2) of FIG. 11(A). The value of S1 of expression (2) is written in the S register.

In the step S7, the difference between the content of the R register for storing the integrated value up to the preceding calculation and the content of the S register for storing the current calculation is obtained. This difference is divided by the current calculated value, which is the content of the S register, to obtain the precision of the integrated value. The contents of the S and R registers are supplied to the operation circuit 5 to obtain the difference therebetween, and division by the content of the S register is performed. Since the content of the R register is "0" as shown in (2) of FIG. 11(A), "1" is written in the E register as shown in (3) of FIG. 11(A). In the next step S8, it is detected whether or not the integrated value has achieved the predetermined precision by judging whether or not the content of the E register is smaller than "1×10⁻⁴". The numerical code signal C0 (1×10⁻⁴) output from the ROM 1 and the content of the E register are supplied to the operation circuit 5 for making this judgement. The judgement result is sent to the ROM address part 3 as the judge signal representing the presence or absence of the data or the presence or absence of the carry signal. Since the content of the E register is "1" as shown in (3) of FIG. 11(A), the judgement is "NO" and the program advances to the next step S9.

In step S9, the integration is terminated before it is completed when the precision has not reached a predetermined value, by making a judgment as to whether or not the value of the dividing parameter stored in the N register has reached a particular value, "10". In the same manner as in the above step, the content of the N register and the numerical code signal C0 (10) are supplied to the operation circuit 5 for comparison. Since the content of the N register is "1" in this embodiment, the program advances to the next step S10.

In step S10, transfer of the content of the S register to the R register is performed through the operation circuit 5. "1.1 . . . 1" is written in the R register as shown in (3) of FIG. 11(A) to advance the program to the next step S11.

In step S11, the first term of expression (5) is calculated. The value obtained by dividing the content of the T register by "2" is subtracted from the content of the S register. The obtained result is divided by "2". As a result, "0.38 . . . 8" is written in the S register, as shown in (3) of FIG. 11(A). In the next step S12, the calculation of $2^n$ having the dividing parameter of the N register as the exponent is performed and the result is written in the K register. Since the content of the N register is "1", "2" is written in the K register as shown in (4) of FIG. 11(A). The program then advances to the next step S13 wherein the operation "+1" is performed on the content of the N register to increase the dividing parameter by "1", thereby making the content of the N register "2".

In the next step S14, a new divided width is set by dividing the divided width which is the content of the H register by "2". The content of the H register becomes "0.5" and the program advances to step S15. In step S15, "0" is written in the register to clear it.

In steps S16 to S20, the calculation of $$\sum_{k=0}^{2k+1<2^n} f\{a + (2k + 1)hn\}$$

of expression (4) is performed. In step S16, the operation of "2K−1" is performed on the accumulating parameter stored in the K register, and the divided width of the H register is multiplied by this operation result. The content of the A register is added to the operation result. Since the content of the K register is "2", the operation "2×2−1" is performed. The operation result "3" and the content "0.5" of the H register are multiplied together. The content of the A register is added to the product "1.5". Since the content of the A register is "0", the content of the X register becomes "1.5" as shown in (5) of FIG. 11(A), and the program advances to the next step S17. In step S17, the calculation of f(1.5) for the content "1.5" of the X register is performed. The calculation result of f(1.5) is "0.4", and this is written in the X register as shown in (6) of FIG. 11(A). In step S18, the integrated value of f(x) up to the preceding calculation and the value of f(x) of the current calculation are added. Since the content of the T register is "0" and the content of the X register is "0.4" at this time, "0.4" is written in the T register. The program then advances to step S19 wherein the operation "−1" is performed on the accumulating parameter which is the content of the K register. The calculated value is stored in the K register and the program then advances to step S20. In step S20, it is judged whether or not the accumulating parameter of the K register is "0". Since the content of the K register is "1" as shown in (7) of FIG. 11(A), the program goes back to step S16. In step S16, the same process as described above is performed on the content "1" of the K register, and "1" is written in the X register as shown in (7) of FIG. 11(A). Steps S17 to S19 are executed in a manner similar to that described above. Thus, the content of the K register becomes "0" as shown in (8) of FIG. 11(A). A judgement of "YES" is made in the next step S20, and the program goes to step S5. In step S5, 4/3 hn is multiplied by the integrated value in expression (4). Consequently, "0.71 . . . 1" is written in the T register as shown in (9) of FIG. 11(B). After step S6, the content of the E register becomes "0.01010 . . . " in step S7. The steps S8 to S11 are executed in a manner similar to that described above, and the registers are placed under the condition shown in (10) of FIG. 11(B). In Step S12, the calculation of "$2^2$" is performed for the content "2" of the N register and "4" is written in the K register as shown in (11) of FIG. 11(B). The steps S13, S14 and S15 are executed similarly, and the respective registers are placed under the conditions shown in (11) of FIG. 11(B). Steps S16 to S20 are sequentially performed until the content of the K register becomes "0".

As shown in (13) of FIG. 11(B), when the content of the K register becomes "0", the program goes to steps S5 and S6. In step S6, the content "0.72650 . . . " of the T register obtained by the current calculation is added to the content "0.372 . . . " of the S register obtained up to the preceding calculation and "1.09872 . . . " is written in the S register as shown in (12) of FIG. 11(B). In step S8, the content of the E register becomes "$1.1601188 \times 10^{-3}$" as shown in (15) of FIG. 11(B). Since the content of the E register in step S9 is greater than "$1 \times 10^{-4}$", the program advances to steps S10 and S11 and the respective registers are placed under the condition shown in (15) of FIG. 11(B). In the next step S12, the calculation of "$2^3$" is performed and "8" is written in the K register. In the next step S13, the operation of "+1" is performed on the content of the N register to make it "4". The steps S14 and S15 are performed to place the H and T registers under the conditions shown in (16) of FIG. 11(B). Steps S16 to S20 are sequentially repeated until the content of the K register becomes "0".

When the content of the K register becomes "0" as shown in (18) of FIG. 11(C), a judgment of "YES" is made in the step S20 and the program goes to steps S5, S6 and S7. In step S7, the content of the E register becomes as shown in (19) of FIG. 11(C). Since the content of the E register is "$9.5853885 \times 10^{-5}$", $E < 1 \times 10^{-4}$ in step S8 and the program advances to step S21. In step S21, the significant digits alone are selected for the integrated value stored in the S register. The integrated value of the current calculation stored in the S register is compared with the integrated value up to the preceding calculation stored in the R register to obtain the corresponding significant digits alone. Thus, the content of the S register becomes "1.098" as shown in (20) of FIG. 11(C). The program then advances to the next step S22 where the content of the S register is transferred to the X register and is displayed as the objective integrated value at the display 6.

Although the value of the operation precision "$|(S-R)/S|$" was "$1 \times 10^{-4}$" in the above embodiments, an integrated value of higher precision may be obtained by making this value smaller.

Although Simpson's formula was used in the above embodiments, the trapezoidal formula or Poncelet's formula may be used instead. It is to be understood that various modifications are possible without departing from the spirit and scope of the present invention.

What is claimed is:

1. A calculator having an integrating function comprising:
   key input means having registering keys for setting at least a function to be integrated and the interval of integration, and an executing key for executing definite integration of the function to be integrated which is input by said registering keys over a definite integration interval which is input by said registering keys;
   first memory means coupled to said key input means for storing the function to be integrated which is input by the key operation of said registering keys of said key input means;
   second memory means coupled to said key input means for storing a dividing number for dividing said interval of integration;
   dividing means coupled to said second memory means for dividing the interval of integration determined by the key operation of said registering keys of said key input means by the dividing number stored in said second memory means;
   readout means coupled to said first memory means for sequentially reading out the function to be integrated from said first memory means; and
   operating means coupled to said first memory means for sequentially performing the integrating function based on the function to be integrated read out by said readout means, every interval of integration divided by said dividing means, and the data for setting the interval of integration input by the key operation of said registering keys of said key input means.

2. A calculator according to claim 1, wherein said key input means includes keys for inputting data to be processed later as a dividing number for dividing the interval of integration; and said second memory means stores, by the key operation for inputting said data to be processed later as a dividing number, a desired dividing number for dividing the interval of integration.

3. A calculator according to claim 1, wherein said second memory means comprises a RAM (random access memory) which stores the dividing number for dividing the interval of integration.

4. A calculator according to claim 1, further including:

third memory means coupled to said operating means for storing a current calculated value and a preceding integrated value obtained by the operation of said operation means;

operation precision calculating means coupled to said third memory means for calculating the operation precision corresponding to said current calculated value and said preceding integrated value stored in said third memory means; and detecting means coupled to said operation precision calculating means for detecting whether or not the operation precision calculated by the operation precision calculating means has reached a predetermined value;

wherein said operation means performs the integration while increasing the dividing number until said detecting means detects that the precision of the integrated value has reached the predetermined operation precision.

* * * * *

UNITED STATES PATENT AND TRADEMARK OFFICE
CERTIFICATE OF CORRECTION

PATENT NO. : 4,398,263
DATED : August 9, 1983
INVENTOR(S) : Hisashi ITO

It is certified that error appears in the above-identified patent and that said Letters Patent is hereby corrected as shown below:

COLUMN 4, line 58, after "this key input" insert the word --section--;

COLUMN 12, line 10, after "to be integrated" insert the word "are".

Signed and Sealed this

Twenty-second Day of November 1983

[SEAL]

Attest:

GERALD J. MOSSINGHOFF

Attesting Officer     Commissioner of Patents and Trademarks